United States Patent
Beers et al.

(10) Patent No.: US 8,496,533 B2
(45) Date of Patent: Jul. 30, 2013

(54) JOURNAL BEARING WITH DUAL PASS COOLING FOR AIR MACHINE

(75) Inventors: Craig M. Beers, Wethersfield, CT (US); Darryl A. Colson, West Suffield, CT (US); Christopher McAuliffe, Windsor, CO (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 505 days.

(21) Appl. No.: 12/728,306

(22) Filed: Mar. 22, 2010

(65) Prior Publication Data

US 2011/0229351 A1  Sep. 22, 2011

(51) Int. Cl.
*F16D 3/76* (2006.01)

(52) U.S. Cl.
USPC ............................................ 464/17; 384/321

(58) Field of Classification Search
USPC ............................................ 464/17; 384/321
See application file for complete search history.

(56) References Cited

U.S. PATENT DOCUMENTS

| | | | |
|---|---|---|---|
| 2,369,795 A * | 2/1945 | Planiol et al. ................. | 415/180 |
| 2,793,506 A | 5/1957 | Moody | |
| 4,573,808 A | 3/1986 | Katayama | |
| 4,764,085 A | 8/1988 | Jesinger | |
| 4,814,653 A | 3/1989 | Hasegawa et al. | |
| 5,113,670 A | 5/1992 | McAuliffe et al. | |
| 6,232,683 B1 | 5/2001 | Hirai et al. | |
| 6,445,769 B1 | 9/2002 | Panasik et al. | |
| 7,342,332 B2 | 3/2008 | McAuliffe et al. | |
| 7,394,175 B2 | 7/2008 | McAuliffe et al. | |
| 7,648,279 B2 | 1/2010 | Struziak et al. | |
| 7,648,280 B2 | 1/2010 | Struziak et al. | |
| 2007/0134105 A1 * | 6/2007 | Beers et al. ................. | 417/407 |

* cited by examiner

*Primary Examiner* — Charles Freay
*Assistant Examiner* — Patrick Hamo
(74) *Attorney, Agent, or Firm* — Carlson, Gaskey & Olds, PC

(57) ABSTRACT

A compressor rotor compresses air and delivers the compressed air to a downstream inlet and across a turbine rotor. A shaft rotates with the turbine rotor and the compressor rotor. The shaft is hollow with an inner bore and an outer periphery. At least one journal bearing supports a portion of the shaft, and has an inner bore spaced from the outer periphery of the shaft. A cooling air path is provided between the shaft outer periphery and the bearing inner periphery, and along a length of the bearing to at least one connection hole. The connection hole provides cooling air from an outer periphery of the shaft to the inner bore of the shaft. In a separate feature, a shaft for use in an air supply machine includes a hollow interior, with such a connection hole.

1 Claim, 2 Drawing Sheets

US 8,496,533 B2

JOURNAL BEARING WITH DUAL PASS COOLING FOR AIR MACHINE

BACKGROUND

This application relates to an air machine in which an air-driven turbine drives an air compressor, wherein journal bearings for a central shaft are provided with a dual path cooling.

Air machines are known and include a turbine driving a compressor. Partially compressed air is delivered to the compressor, and the compressor is driven to further compress this air. This compressed air is passed downstream to drive a turbine, with the turbine in turn driving the compressor as the air expands across the turbine. This expanded air is then utilized for a downstream use, such as cabin air for an aircraft.

The known air machines have a shaft which connects the compressor and the turbine. Journal bearings are provided for this shaft. In the past, an air cooling system was provided to pass air between the inner periphery of the journal bearing, and the outer periphery of the shaft.

SUMMARY

An air supply machine has a compressor rotor for compressing air and delivering the compressed air to a downstream inlet. Air from the downstream inlet passes across a turbine rotor to drive the turbine rotor to rotate. The turbine rotor is connected to the compressor rotor such that rotation of the turbine rotor drives the compressor rotor to rotate and compress the air. A shaft is connected to rotate with the turbine rotor and the compressor rotor. The shaft is hollow with an inner bore and an outer periphery. At least one journal bearing is positioned to support a portion of the shaft, and to have an inner bore spaced from the outer periphery of the shaft. A cooling air path provides cooling air between the outer periphery of the shaft and the inner periphery of the bearing, and along a length of the bearing to at least one connection hole. The connection hole provides cooling air from an outer periphery of the shaft to the inner bore of the shaft. The cooling air then passes through the inner bore of the shaft and along a length of the bearing.

In a separate feature, a shaft for use in an air supply machine includes a hollow interior, with a connection hole for communicating cooling air from an outer periphery of the shaft to an inner bore of the shaft.

These and other features of the present invention can be best understood from the following specification and drawings, the following of which is a brief description.

DETAILED DESCRIPTION

Figure 1:
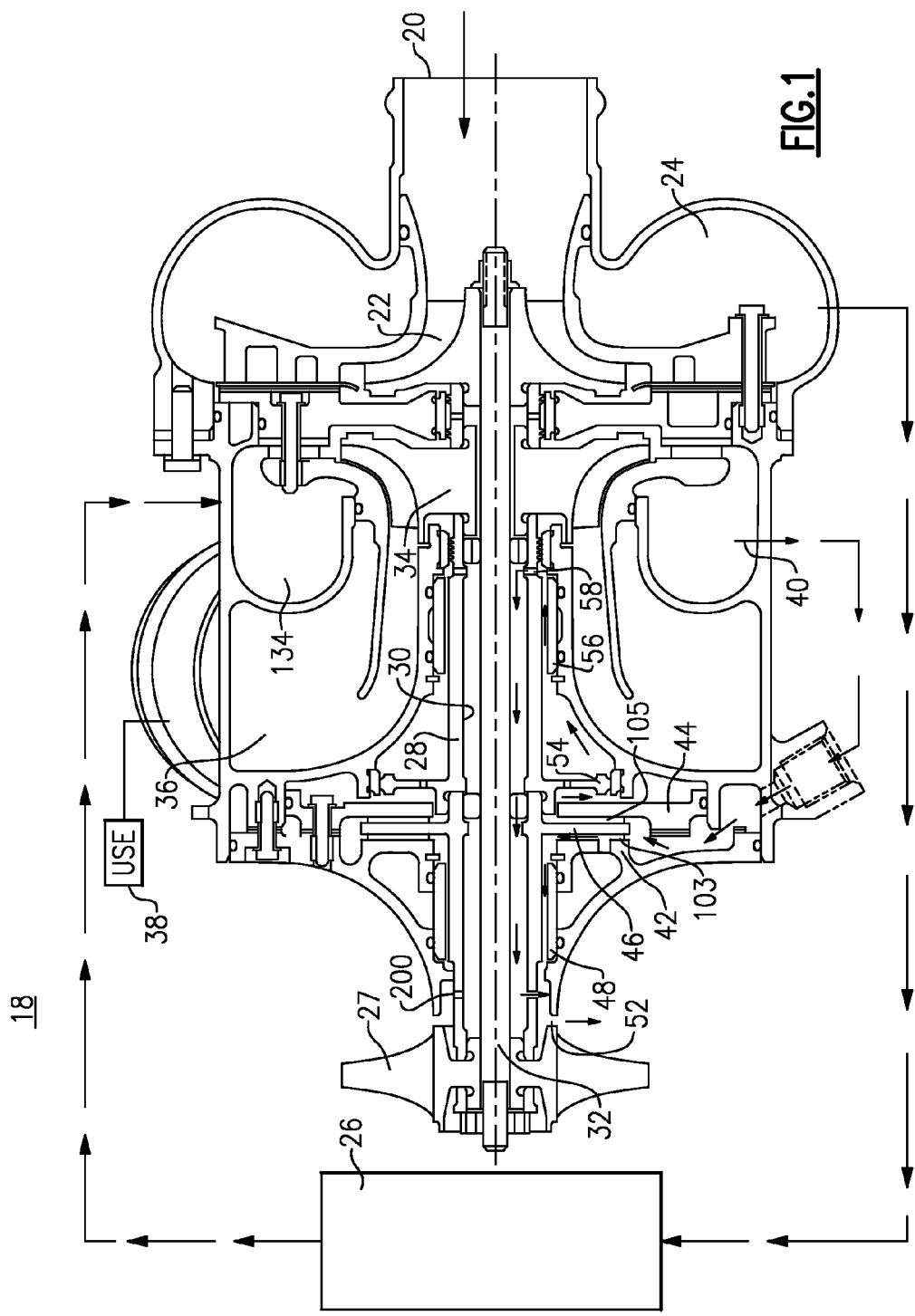
FIG. 1 schematically shows a system incorporating the present invention.

An air machine 18 is illustrated in FIG. 1 having an air inlet 20 receiving partially compressed air, such as downstream of the compressor in a gas turbine engine. This air is delivered to another compressor impeller or rotor 22, where it is further compressed and delivered into a discharge plenum 24. From the discharge plenum 24, the air passes through a heat exchanger 26. A fan 27 is driven by a shaft 28, which is a hollow shaft having an interior bore 30. While the shaft is shown in this embodiment as several distinct components, it should be understood that the term "shaft" could extend to all of the components from the left-hand side of this Figure up to a turbine rotor or impeller 34, and then to the compressor rotor 22. An interior bore 30 is formed in the hollow shaft 28. A central tie shaft 32 ties the fan 27 to the turbine impeller 34 and the compressor impeller 22.

Compressed air from the discharge plenum 24 thus passes through the heat exchanger 26, is cooled by the fan 27, and returned to an inlet plenum 134 downstream of the compressor rotor 22, where it then passes over the turbine rotor 34. The air is expanded and the turbine rotor 34 is driven to drive the compressor rotor 22 and the fan 27. This expanded air then passes into a discharge plenum 36, and then to a downstream use 38. One example use of downstream use 38 would be a cabin air supply for an aircraft.

A cooling air supply is tapped at 40 from the inlet plenum 134 and passes into a cooling path, and is split into paths 103 and 105 to both sides of a thrust bearing cylindrical member 46, which is perpendicular to, and driven to rotate with, the shaft 28. To a side closest to the rotors 22 and 34, the air passes between the member 46 and a housing 44, through a tortuous path 54, and then to cool an interface surface between a journal bearing 56, and the outer periphery of the shaft 28. As shown, the air passes along the surface, through a connection hole 58 in the shaft 28, and into an interior bore between an outer periphery of the tie shaft 32, and the inner bore 30 of the shaft 28. The air passes along the entire length of the bearing 56, and also bearing 48, before exiting at an exit 52. On the other hand, the air split on the opposed side of the member 46 passes between a housing 42 and the member 46, and then within an interior bore of the bearing 48 and the outer periphery of the shaft 28. Thus, both bearings 48 and 56, and the associated shaft surfaces, are provided with dual cooling air flow paths.

Communication holes 200 extend back outwardly of the shaft 28, to communicate the air from the inner bore outwardly of and to the ultimate exit 52.

As can be appreciated from the drawings, the cooling air path may pass along the entire length of the bearing 56 and the bearing 48 at both the inner and outer peripheral flow path portions. However, for purposes of the claims in this application, the term "a length of the bearing" refers to a portion of the length of the bearing, and may include the entire length of bearing 48 and/or bearing 56.

Figure 2:
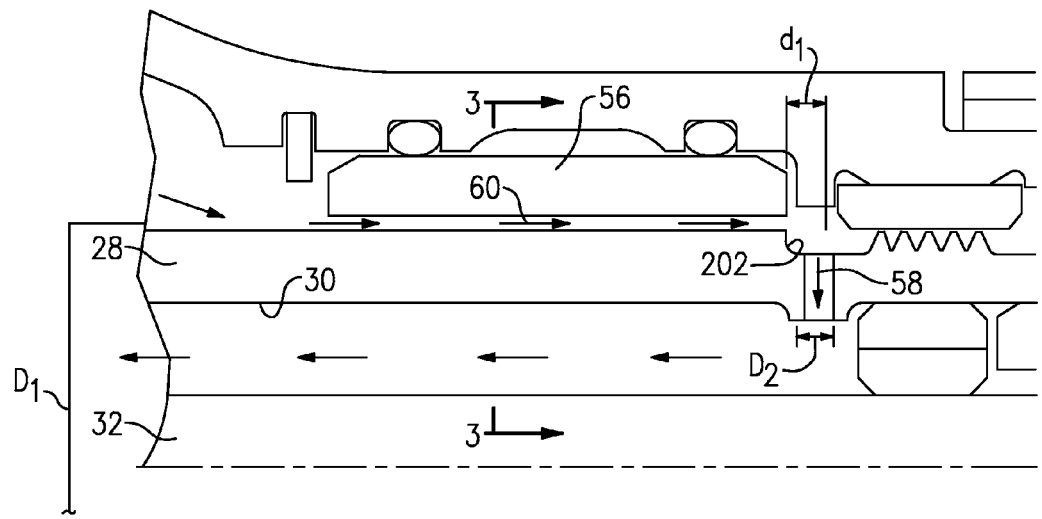
FIG. 2 shows a detail of the FIG. 1 system.
Figure 3:
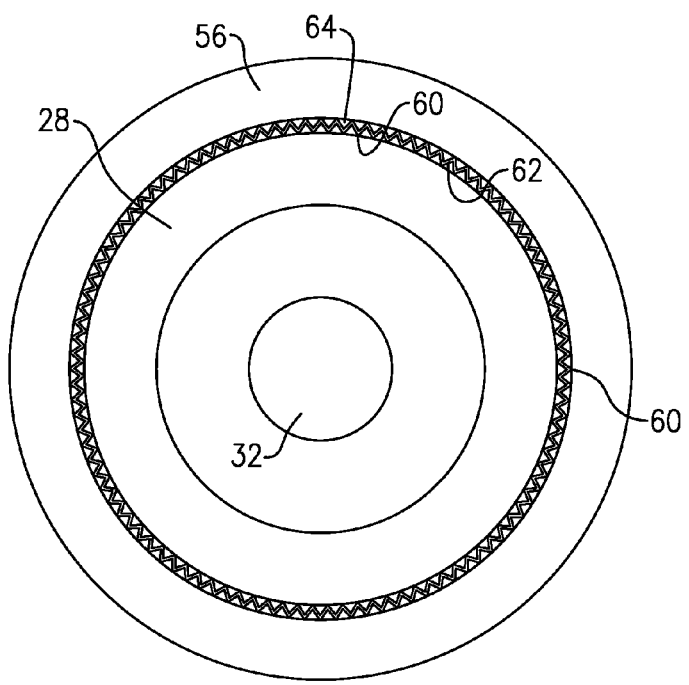
FIG. 3 is a cross-sectional view along line 3-3 as shown in FIG. 2.

As shown in FIG. 2, the bearing 56 (and 48 may be similarly structured) has a bearing foil 60. As can be appreciated from FIG. 3, the bearing foil 60 actually has corrugations that form flow paths 62 and 64 in an inner bore of the bearing 56 between an inner periphery of the bearing 56 and the outer periphery of the shaft 28. The air bearing that provides the journal bearing is typically provided between the portions of the foil 60 which are spaced closest to the outer periphery of the shaft 28. However, the cooling air flows in all of the spaces of flow paths 62 and 64 to cool both the bearing and the outer periphery of the shaft 28. As further shown in FIG. 2, the air passes through one, or preferably several, connection holes 58 into the interior bore 30.

As can be appreciated from FIG. 2, the shaft 28 has an outer diameter $D_1$, while the communication holes 58 have a diameter $D_2$. In embodiments, the diameter $D_2$ ranges from 0.070-0.085" (1.77-2.15 mm). There are six holes, circumferentially equally spaced in a common axial plane. This common axial plane is spaced by a distance $d_1$ from an end of the bearing 56. In the embodiment, the $d_1$ is 0.50" (12.7 mm). All of these measurements are in an air machine wherein the $D_1$ is 0.90" (22.9 mm). Stated another way, the ratio of $D_2$ to $D_1$ is between 0.077 and 0.094. Further, the $d_1$ is less than the diameter $D_1$, but greater than the diameter $D_2$.

In addition, there is a nominal portion of the shaft at the diameter $D_1$, and a ditch 202 forming a smaller diameter portion in a plenum or chamber to collect air for delivery into the communication holes 58.

A thrust bearing cooling system is disclosed in co-pending patent application Ser. No. 12/728,313, entitled "Thrust Bearing Cooling Path" and filed on even date herewith.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A shaft for use in an air supply machine comprising:
   said shaft being hollow with an inner bore and an outer periphery, and a plurality of connection holes formed in said shaft, to provide cooling air from said outer periphery to said inner bore, and said plurality of connection holes for passing air along said inner bore of said shaft:
   a ratio of a diameter of said connection holes to an outer diameter of said outer periphery of said shaft is between .077 and .094:
   there are six of said connection holes, and said connection holes spaced to be formed at a distance from an end of a journal bearing that is to be associated with said outer periphery, and said distance being less than said outer diameter of said outer periphery of said shaft; and
   said shaft has a first outer peripheral portion to receive the journal bearing at said outer periphery, and a ditch having a smaller diameter, and said plurality of connection holes being formed in said ditch.

* * * * *